(12) United States Patent
Kim et al.

(10) Patent No.: US 8,876,601 B2
(45) Date of Patent: Nov. 4, 2014

(54) METHOD AND APPARATUS FOR PROVIDING A MULTI-SCREEN BASED MULTI-DIMENSION GAME SERVICE

(71) Applicant: Electronics and Telecommunications Research Institute, Daejeon (KR)

(72) Inventors: Sung-Soo Kim, Daejeon (KR); Chunglae Cho, Daejeon (KR); Yun Kyung Park, Daejeon (KR); Jin Tae Kim, Daejeon (KR); Kyeong Deok Moon, Daejeon (KR); Jun Hee Park, Daejeon (KR); Ji Yeon Son, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 78 days.

(21) Appl. No.: 13/851,931

(22) Filed: Mar. 27, 2013

(65) Prior Publication Data

US 2013/0260883 A1    Oct. 3, 2013

(30) Foreign Application Priority Data

Mar. 27, 2012 (KR) .................. 10-2012-0031109
Jul. 3, 2012 (KR) .................. 10-2012-0072271

(51) Int. Cl.
*G06F 17/00* (2006.01)
*A63F 13/00* (2014.01)

(52) U.S. Cl.
CPC ...................... *A63F 13/00* (2013.01)
USPC .......................................... 463/31

(58) Field of Classification Search
CPC ...................................... A63F 13/00
USPC .................................... 463/29–32
See application file for complete search history.

(56) References Cited

U.S. PATENT DOCUMENTS

| | | | |
|---|---|---|---|
| 2007/0091016 A1* | 4/2007 | Han et al. | 345/60 |
| 2011/0102423 A1 | 5/2011 | Nam et al. | |
| 2012/0019516 A1 | 1/2012 | Park et al. | |
| 2012/0220355 A1* | 8/2012 | Haltovsky et al. | 463/16 |
| 2013/0244784 A1* | 9/2013 | Assa | 463/40 |

FOREIGN PATENT DOCUMENTS

| | | |
|---|---|---|
| KR | 10-2011-0049039 A | 5/2011 |
| KR | 10-2012-0010404 A | 2/2012 |

OTHER PUBLICATIONS

Zhu Liu et al., "Content Personalization and Adaptation for Three-Screen Services", CIVR'08 Proceedings of the 2008 international conference on Content-based image and video retrieval, Jul. 8, 2008, pp. 635-644.

* cited by examiner

*Primary Examiner* — Ronald Laneau

(57) ABSTRACT

A method and apparatus provides a multi-screen based multi-dimensional game service using a home network and a home server. The method includes determining a resolution of a game screen to be served based on terminal information provided from a user terminal, storing a view on a user location in a multi-dimensional shared game space as a game session, generating an object for the view based on the determined resolution, performing multi-view rendering using multi-dimensional scene data and a user game input, capturing video and audio generated through the multi-view rendering, encoding the captured video and audio, and transmitting encoded video and audio to the user terminal.

12 Claims, 6 Drawing Sheets

METHOD AND APPARATUS FOR PROVIDING A MULTI-SCREEN BASED MULTI-DIMENSION GAME SERVICE

RELATED APPLICATIONS(S)

This application claims the benefit of Korean Patent Application No. 10-2012-0031109, filed on Mar. 27, 2012 and Korean Patent Application No. 10-2012-0072271, filed on Jul. 3, 2012, which are hereby incorporated by references as if fully set forth herein.

FIELD OF THE INVENTION

The present invention relates to a method and apparatus for providing a multi-screen based multi-dimensional game service using a home server and a home network, and more particularly to a method and apparatus for providing a multi-screen based multi-dimensional game service, which is suitable for rendering and streaming scenes with a resolution appropriate for a user terminal based on game inputs of a user and user terminal information when a game is continuously executed by a plurality of user terminals or when a plurality of users plays a game.

BACKGROUND OF THE INVENTION

Recently, as a technology for a network and various user terminals is developed, a demand for a multi-screen service is rapidly increasing. A user can receive a service for a single content by moving one user terminal to another user terminal through the multi-screen service.

In particular, a computer game service is being developed into an on-line game or server-end type game service in which a user can play a game with other users through a home network or an internet network, escaping from a conventional game service in which a user plays a game independently in a personal computer (PC). Such a game service in the home is being provided with a further advanced function through a game-dedicated console. The game-dedicated console can recognize movement of a user using a stereo camera in a home network.

However, a multi-screen service based game service, which has been provided on a home network using the existing game-dedicated console, is not provided yet at a user terminal.

In addition, an approaching method for the conventional multi-screen service transcodes one media according to a resolution of a user terminal and provides the transcoded media. As a result, both decoding and encoding should be performed on an original media.

Herein, the transcoding is a process of converting a media having a certain resolution and media property into a media having a different resolution and media property. The transcoding includes a decoding process for an original media and an encoding process for a decoded media to generate a target media to be converted. The transcoding requires various processing methods and speeds according to the original media to be converted, so that it is difficult to satisfy a response time of a game service.

Therefore, in a game service in which a plurality of users plays a game in a single shared space, it takes a long time to process a media according to properties of a user terminal, such as a resolution. One of fundamental reasons causing this problem is obtained by applying a conventional scheme that renders a game in the same manner and transcodes the rendered game without obtaining resolution information of the user terminal in advance.

When serving moving picture contents of a movie using the conventional multi-screen service, one original media should be transcoded according to user terminal information and then provided to a user. Since, however, a game is a real-time media whose scenes change according to game inputs of a user, game scenes are newly rendered according to the game inputs of the user and then provided to the user. Thus, it is different from a case of using a media, such as movie contents, which is prepared in advance. Traditionally, this game scene rendering is performed using a game engine or a game application software. Therefore, it is not effective to use the conventional scheme to provide a media to a small number of terminals existing in a home network, in aspects of a processing time and computing resource utilization.

Therefore, in case of playing a three-dimensional shared game through terminals in a home network, a multi-view rendering is more effective to reduce a processing time and to improve computing resource utilization. In the multi-view rendering, after information on shared scenes is loaded on a server in advance, the server receives game inputs and view information of each user are processes the received information.

There is a need to combine a multi-screen service using a home server with user terminal information and game input information. Meanwhile, recently, a technology of processing various types of software services in a server is being activated on the strength of the development of a cloud computing related system and service technology. As a result, there is a demand of introducing a service scheme in which a home server processes encoding/streaming and rendering of game scenes, which require a lot of arithmetic operations, using the server-end computing technology, and the user terminal in the home network decodes and displays the game scenes.

SUMMARY OF THE INVENTION

It is, therefore, an object of the present invention to solve a problem such as a difficulty in providing a multi-screen service according to a change of a user terminal when a multi-dimensional (e.g., three-dimensional) shared game is served in a conventional service related to a multi-screen service using a home network.

In accordance with an embodiment of the present invention, an input signal of a game user is input through a home network, and a user terminal information management and multi-view rendering are performed in a home server. Therefore, it is possible to provide a scheme capable of providing a game on the home network even if a user terminal does not include high specification hardware.

In addition, in accordance with an embodiment of the present invention, a processing speed can be improved with encoding only even if the transcoding for a multi-screen service is not preformed. Therefore, it is possible to provide a new scheme capable of transferring a service by minimizing a delay time according to the game playing of a user.

In accordance with an aspect of the present invention, there is provided a method for providing a multi-screen based multi-dimensional game service, the method including: determining a resolution of a game screen to be served based on user terminal information provided from a user terminal; storing a view for a user location on a multi-dimensional shared game space as a game session; generating an object for the view based on the determined resolution, and performing multi-view rendering using multi-dimensional scene data and game inputs of a user; capturing video and audio generated through the multi-view rendering; and encoding the captured video and audio, and transmitting the encoded video and audio to the user terminal.

In accordance with another aspect of the present invention, there is provided an apparatus for providing a multi-screen based multi-dimensional game service, the apparatus including: a user terminal management block configured to determine a resolution of a game screen to be served based on user terminal information provided from a user terminal; a user game session management block configured to store a view for a user location on a multi-dimensional shared game space as a game session; a multi-view rendering execution block configured to generate an object for the view based on the determined resolution, and perform multi-view rendering using multi-dimensional scene data and game inputs of a user; an encoding block configured to encode video and audio generated through the multi-view rendering; and an encoding scene stream processing block configured to process the encoded video and audio to generate a game moving picture stream, and transmit the game moving picture stream to the user terminal.

In accordance with still another aspect of the present invention, there is provided a method for providing a multi-screen based multi-dimensional game service, the method including: determining a resolution of a game screen to be served based on user terminal information provided from a user terminal; checking whether or not a game session for the user terminal exists; if the game session exists, obtaining a view from the game session and adding the user view onto a multi-dimensional shared game space; if the game session does not exist, storing a view for an initial location of a user on the multi-dimensional shared gate space as the game session; generating an object for the view obtained from the game session or the view for the initial location based on the determined resolution, and performing multi-view rendering using multi-dimensional scene data and game inputs of the user; capturing video and audio generated through the multi-view rendering; and encoding the captured video and audio, and transmitting the encoded video and audio to the user terminal.

Embodiments of the present invention are directed to a method and apparatus for providing a multi-screen based multi-dimensional game service, which determines a resolution of a game screen to be served based on terminal information provided from a user terminal, stores a view on a user location in a multi-dimensional shared game space as a game session, generates an object for the view based on the determined resolution, performs multi-view rendering using multi-dimensional scene data and a user game input, captures video and audio generated through the multi-view rendering, encodes the captured video and audio, and transmits encoded video and audio to the user terminal. Therefore, it is possible to provide a game on a home network even if the user terminal does not include high specification hardware. In addition, by improving a processing speed with encoding only even though the transcoding for a multi-screen service is not preformed, it is possible to minimize a delay time according to the game playing of a user and reduce a game response time of the user.

BRIEF DESCRIPTION OF THE DRAWINGS

The above and other objects and features of the present invention will become apparent from the following description of embodiments given in conjunction with the accompanying drawings, in which.

DETAILED DESCRIPTION OF THE EMBODIMENTS

Unlike a conventional scheme of transcoding and encoding game scenes according to a resolution of a user terminal, embodiments of the present invention are directed to a scheme of determining a resolution of a game screen to be served based on terminal information provided from a user terminal, storing a view on a user location in a multi-dimensional shared game space as a game session, generating an object for the view based on the determined resolution, performing multi-view rendering using multi-dimensional scene data and a user game input, capturing video and audio generated through the multi-view rendering, encoding the captured video and audio, and transmitting encoded video and audio to the user terminal. Therefore, it is possible to effectively improve drawbacks of the conventional scheme using these technical means.

In the following description of the present invention, if the detailed description of the already known structure and operation may confuse the subject matter of the present invention, the detailed description thereof will be omitted. The following terms are terminologies defined by considering functions in the embodiments of the present invention and may be changed operators intend for the invention and practice. Hence, the terms should be defined throughout the description of the present invention.

Hereinafter, embodiments of the present invention will be described in detail with reference to the accompanying drawings so that they can be readily implemented by those skilled in the art.

Figure 1:
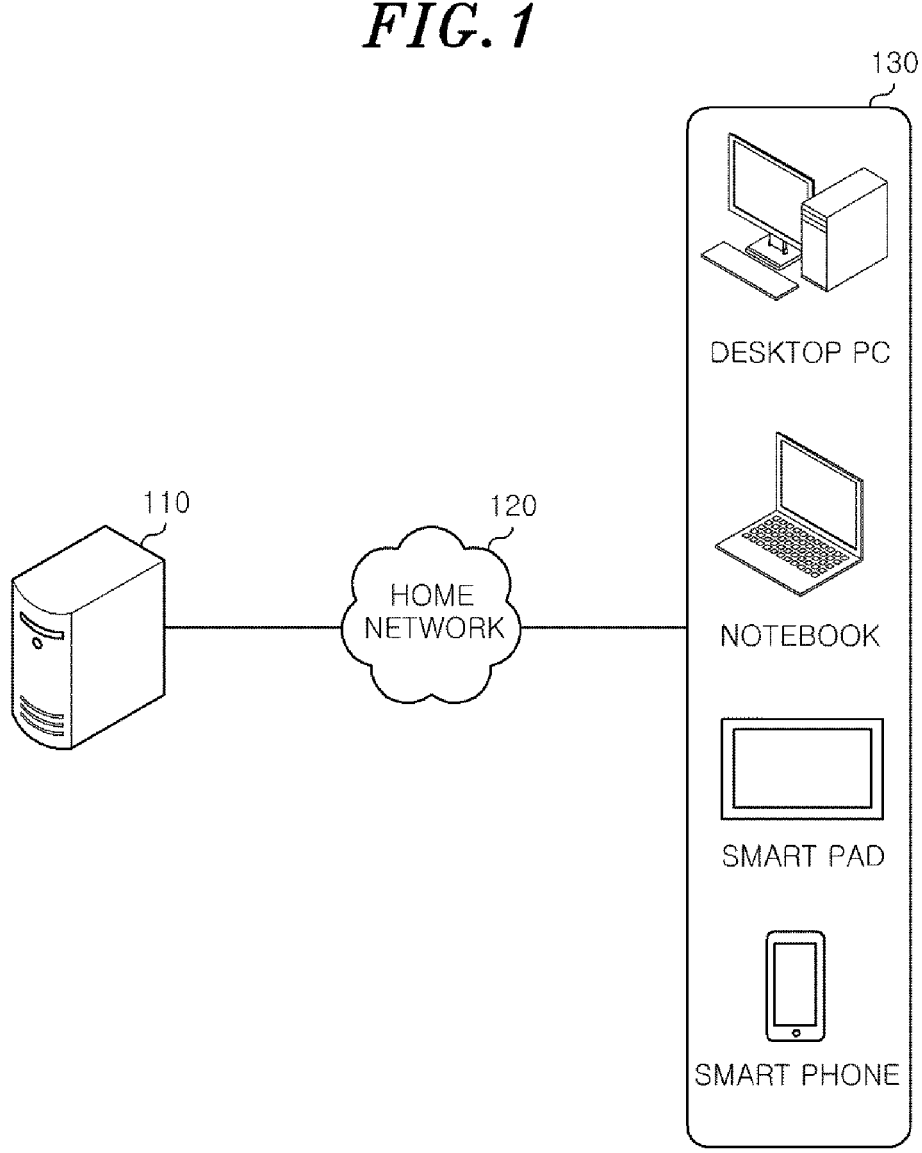
FIG. 1 illustrates a schematic diagram of a game service system suitable for applying a method for providing a multi-screen based multi-dimensional game service in accordance with an embodiment of the present invention.

FIG. 1 illustrates a schematic diagram of a game service system suitable for applying a method for providing a multi-screen based multi-dimensional game service in accordance with an embodiment of the present invention.

Referring to FIG. 1, the game service system includes a home server 110 connected to a home network 120, and a user terminal 130 such as a desktop personal computer (PC), a notebook, a smart pad, a smart phone, or the like.

Herein, a game is not played using a central processing unit (CPU) and a graphic processing unit (GPU) of the user terminal 130. Instead, a streaming based game service scheme is used. The streaming based game service scheme performs game service components such as game animation, sound generation, artificial intelligence system functions, physical simulation, rendering, and so on using hardware resources, such as a CPU and a GPU, which exist in the home server 110 connected to the home network 120, and streams images showing game results to a user.

In particular, the home server 110 shares multi-dimensional game scene data using views of a plurality of users for a multi-dimensional shared game (e.g., a three-dimensional shared game, a four-dimensional shared game, etc.), renders the multi-dimensional game scene data by applying a resolution of the user terminal 130 and a view of each user, and streams the rendered data. In accordance with an embodiment of the present invention, in the home, the home server 110 performs game rendering and encoding using resolutions of various user terminals and a view of the user in the multi-dimensional game, and transmits a result of the game rendering and encoding to the user terminal 130. That is, the home server 110 connected to the home network 120 can perform functions of streaming, encoding, and multi-dimensional game rendering for the multi-screen service.

The user terminal 130 processes game inputs of the user for the multi-screen based shared game service. That is, the user terminal 130 transmits the game inputs to the home server 110. In addition, the user terminal 130 decodes result media (video/audio) received from the home server 110 through the home network 120, and then outputs/displays the decoded result media through a screen, a speaker, and so on. If a certain user receives a service on a game progress as moving from one terminal to another terminal, the home server 110 provides a seamless multi-screen service by applying view information stored in a user session and user terminal information (resolution).

The user terminal 130 receives a game service from the home server 110 through the wired or wireless home network 120 according to its type. At this time, the user terminal 130 can receive a streaming based game service with a resolution suitable for the user terminal 130. In the user terminal 130, the game inputs of the user may be performed through a keyboard, a mouse, a touch input, and so on according to a property of the user terminal 130. The home server 110 processes the game inputs based on an input mapping table pre-stored therein using an input logic of a served game, the game inputs, and information on the user terminal 130.

Figure 2:
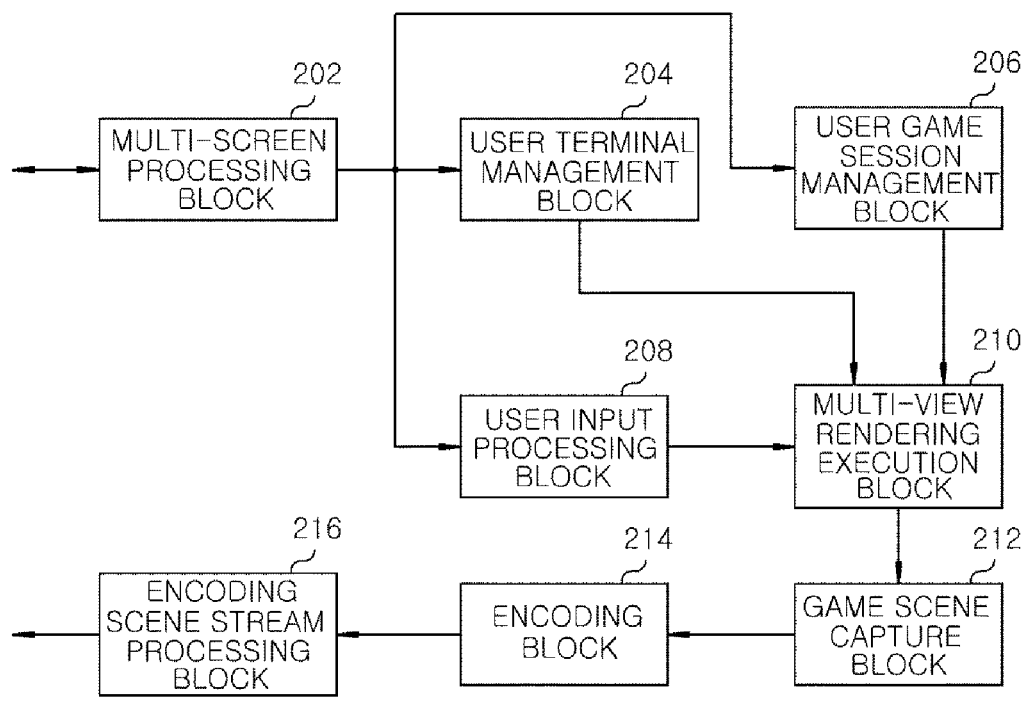
FIG. 2 illustrates a block diagram of an apparatus for providing a multi-screen based multi-dimensional game service in accordance with an embodiment of the present invention.

FIG. 2 illustrates a block diagram of an apparatus for providing a multi-screen based multi-dimensional game service in accordance with an embodiment of the present invention. The apparatus includes a multi-screen processing block 202, a user terminal management block 204, a user game session management block 206, a user input processing block 208, a multi-view rendering execution block 210, a game scene capture block 212, an encoding block 214, and an encoding scene stream processing block 216.

Referring to FIG. 2, the multi-screen processing block 202 starts a multi-dimensional shared game service when it receives a game service start request from the user terminal 130 in the home, which is connected to the home network 120. The multi-screen processing block 202 transmits user terminal information (e.g., resolution) to the user terminal management block 204 and transfers view information on a location of a user on a multi-dimensional (e.g., three-dimensional, four-dimensional, and so on) shared game space to the user game session management block 206. In addition, the multi-screen processing block 202 transmits game inputs of the user, which are received while the game service is in progress, to the user input processing block 208.

Herein, the user location on the multi-dimensional space may include a location of an observer, which is a three-dimensional view, i.e., $X_p$, $Y_p$, and $Z_p$, a focal point where the observer looks at, i.e., $X_f$, $Y_f$, and $Z_f$, and a field of view (FOV).

The user terminal management block 204 determines a resolution of a game screen to be served based on the user terminal information received from the user terminal 130. For instance, if the user terminal 130 is the desktop PC, the resolution to be served may be determined as 1600×1200. If the user terminal 130 is the smart phone, the resolution may be determined as 640×480. Information on the determined resolution is provided to the multi-view rendering execution block 210.

The user game session management block 206 stores a current view (game view) with respect to the user location on the multi-dimensional shared game space as a game session in an internal memory (not shown). If a game session is terminated after the user played a three-dimensional shared game in a previous time through the user terminal 130 and paused the game, the user view information on a three-dimensional space is stored in the user game session management block 206. The user view stored as the game session may be used when the user resumes the shared game service later.

Herein, the user location on the three-dimensional space may include a location of an observer, which is a three-dimensional view, i.e., $X_p$, $Y_p$, and $Z_p$, a focal point where the observer looks at, i.e., $X_f$, $Y_f$, and $Z_f$, and a field of view (FOV).

The user game session management block 206 searches the internal memory to check whether or not the game session for the user terminal 130 exists in the internal memory when there is a shared game service request from the user. If the game session exists in the internal memory, the user game session management block 206 obtains the user view stored in the internal memory and then adds the obtained user view to the multi-dimensional shared game space. On the other hand, if the game session does not exist in the internal memory, the user game session management block 206 stores a view for the user location on the multi-dimensional shared game space as a game session.

The user input processing block 208 processes the game inputs of the user who is performing the multi-dimensional shared game service, and transmits the processed game inputs to the multi-view rendering execution block 210.

The multi-view rendering execution block 210 generates an object for the game view received from the user game session management bock 206 based on the resolution determined by the user terminal management block 204, and performs multi-view rendering using the game inputs of the user and multi-dimensional scene data. In case of an initial execution of a single user, the multi-view rendering execution block 210 generates an object for an initial view, performs the multi-view rendering using game inputs of the user and three-dimensional scene data that is previously prepared, and generates one frame of game progress images. Herein, the multi-view rendering may be performed using a rendering API (Application Programming Interface), such as OpenGL, DirectX, or the like, or a game engine well known in the art. One rendered image is stored in a frame buffer region.

The game scene capture block 212 captures a scene result rendered by users, i.e., one rendered scene image (video) and game sound (audio), from a frame buffer (not shown), and transfers the captured video and audio to the encoding block 214.

The encoding block 214 combines the captured scene image (video) and game sound (audio) transferred from the game scene capture block 212, and encodes the combined video and audio. The encoding block 214 may perform the encoding using an MPEG-4 encoder or an H.264 encoder. That is, the encoding block 214 performs the encoding by combining video and audio based on a frame number of a scene in a game, and transfers encoded data to the encoding scene stream processing block 216.

The encoding scene stream processing block 216 processes the encoded data provided thereto to generate a multi-dimensional game moving picture stream, and transfers the game moving picture stream to the user terminal 130. The encoding scene stream processing block 216 may transmit the game moving picture stream to the user terminal 130 using a real-time protocol (RTP) or a real-time streaming protocol (RTSP).

Hereinafter, a sequence of processes for providing a multi-screen based multi-dimensional game service to users will be described using the apparatus that has the above-described configuration.

Figure 3:
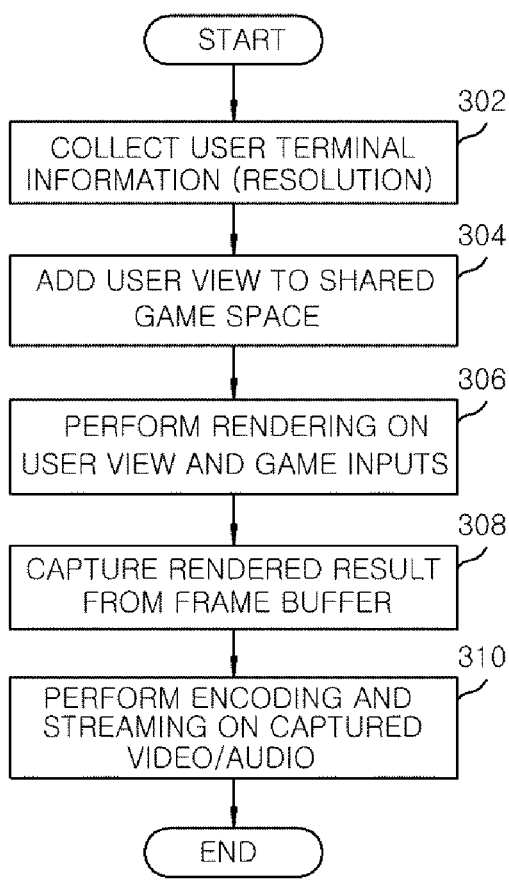
FIG. 3 is a flowchart illustrating processes of providing a multi-screen based multi-dimensional game service in accordance with an embodiment of the present invention.

FIG. 3 is a flowchart illustrating processes of providing a multi-screen based multi-dimensional game service in accordance with an embodiment of the present invention.

Referring to FIG. 3, if the user terminal 130 accesses the home server 110 and requests a multi-dimensional shared game service, the user terminal management block 204 collects and determines a resolution to be served based on user terminal information provided from the user terminal 130 at step 302.

After that, the user game session management block 206 stores or adds a view for an initial location of a user on a multi-dimensional shared game space as a game session in an internal memory at step 304. At this time, the user input processing block 208 processes game inputs of the user for the multi-dimensional shared game and transfers the processed game inputs to the multi-view rendering execution block 210.

The multi-view rendering execution block 210 receives the game inputs and the view of the user, and renders the multi-dimensional game scene using a rendering API, such as OpenGL, DirectX, or the like, or a game engine well known in the art at step 306. One rendered image is stored in a frame buffer region.

After that, the game scene capture block 212 captures one rendered scene image (video) and game sound (audio) from the frame buffer, and transfers the captured video and audio to the encoding block 214 at step 308.

As a result, the encoding block 214 combines and encodes the captured scene image and game sound using an MPEG-4 encoder or an H.264 encoder. The encoding scene stream processing block 216 processes the encoded data to generate a multi-dimensional game moving picture stream, and transmits/streams the multi-dimensional game moving picture stream to the user terminal 130 through the home network 120 at step 310. Herein, the game moving picture stream may be transmitted using a real-time protocol (RTP) or a real-time streaming protocol (RTSP).

Thereafter, the user terminal 130 decodes the video and audio data for the rendered result transmitted thereto using, e.g., an MPEG-4 decoder or an H.264 decoder, and then outputs the decoded result through a screen and a speaker. That is, the decoded video is displayed through the screen, and the decoded audio is reproduced through an audio regenerator. These processes performed in the user terminal 130 are repeatedly performed while the user plays the multi-dimensional shared game.

Figure 4:
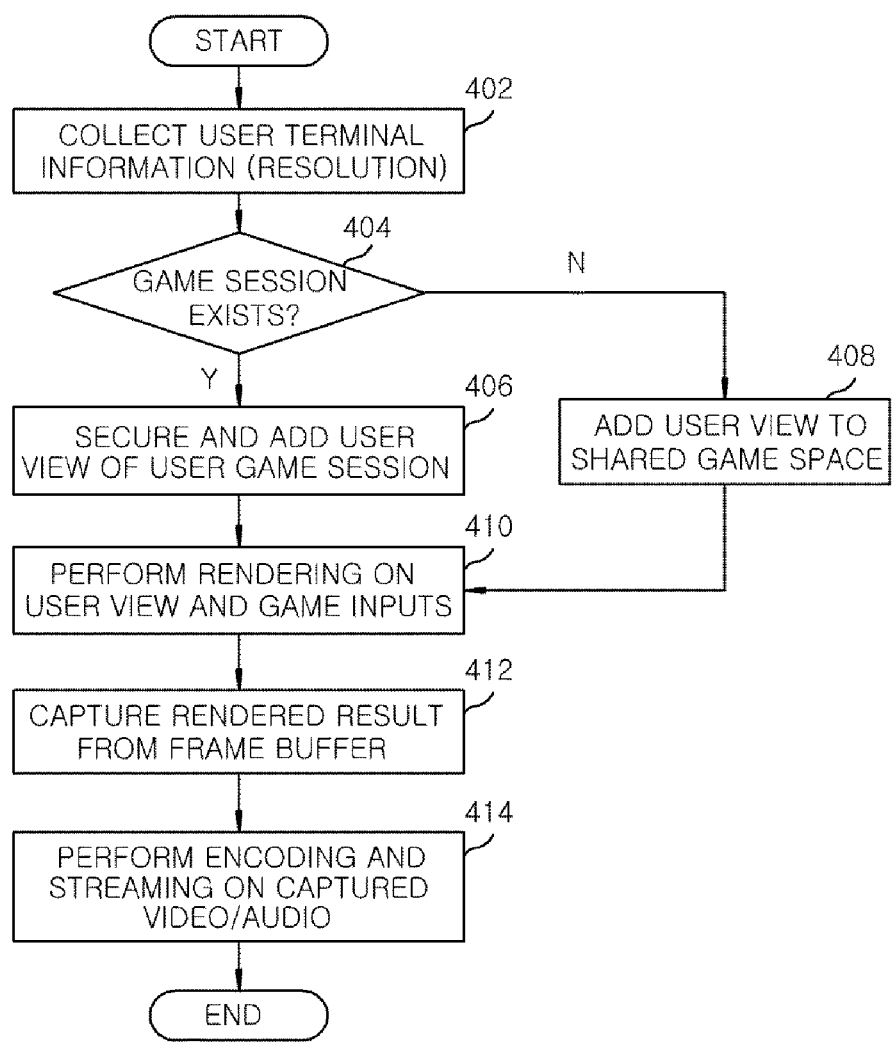
FIG. 4 is a flowchart illustrating processes of providing a multi-screen based multi-dimensional game service in accordance with an embodiment of the present invention.

FIG. 4 is a flowchart illustrating processes of providing a multi-screen based multi-dimensional game service in accordance with an embodiment of the present invention.

First of all, the multi-dimensional game service may include a case that a user previously executes a game through the user terminal 130 at the home server 110 and then pauses the game to terminate a game session. A procedure for processing this is required.

Referring to FIG. 4, if the user terminal 130 accesses the home server 110 and requests a multi-dimensional shared game service, the user terminal management block 204 collects and determines a resolution to be served based on user terminal information transferred from the user terminal 130 at step 402.

After that, the user game session management block 206 searches the internal memory and checks whether or not a game session for the user terminal 130 exists in the internal memory at step 404.

As a result of the checking, if it is determined that there exists the game session, a user view stored in the internal memory is obtained and added onto a multi-dimensional shared game space at step 406.

As a result of the checking at step 404, if it is determined that the game session does not exist in the internal memory, a current view for a user location on the multi-dimensional shared game space is added/stored as a game session at step 408.

After that, rendering for the user view and game inputs, rendering result capture, encoding and streaming, and so on are performed at steps 410 to 414. The processes at steps 410 to 414 are substantially the same as those at steps 306 to 310 of FIG. 3. Therefore, for the simplicity of the description, the detailed explanation for steps 410 to 414 is omitted.

Figure 5:
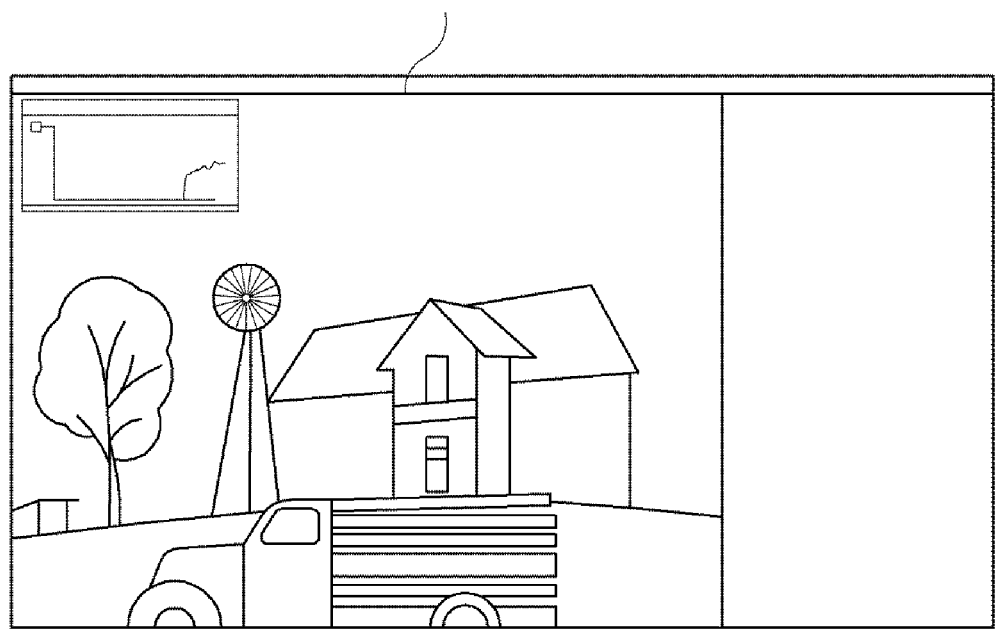
FIG. 5 illustrates a result of performing a game rendering when a user terminal is a desktop, according to an embodiment of the present invention.

FIG. 5 illustrates a result of performing game rendering according to an embodiment of the present invention, when a user terminal is a desktop.

FIG. 5 shows a screen obtained by setting a service resolution to 1600×1200, rendering a game scene, and transmitting the rendered result to the user terminal 130, in the case that the user terminal 130 is the desktop PC.

Figure 6:
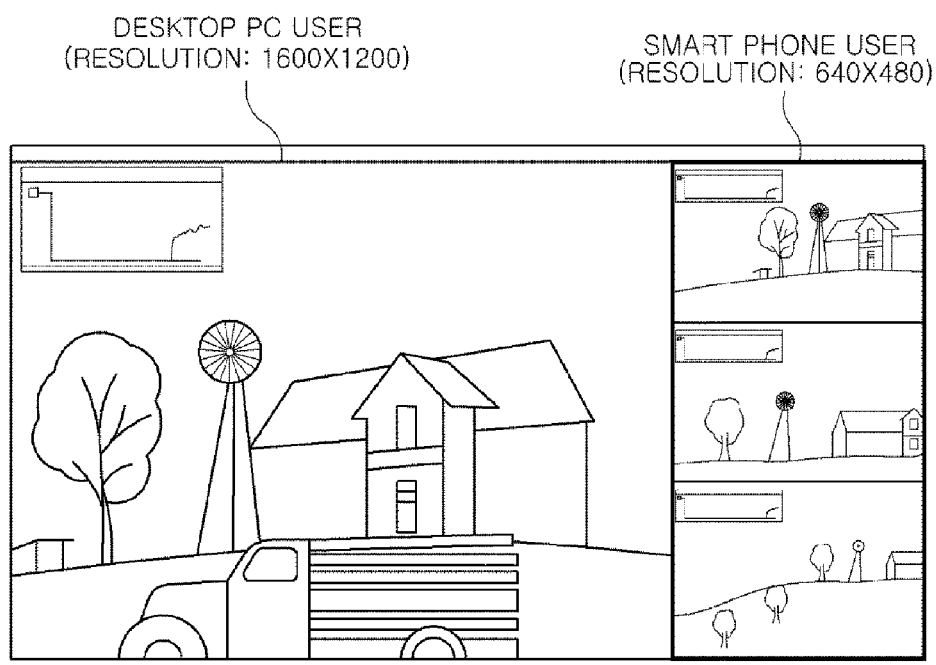
FIG. 6 illustrates a result of performing a multi-view game rendering when a plurality of user terminals uses both a desktop and a smart phone, according to an embodiment of the present invention.

FIG. 6 illustrates a result of performing multi-view game rendering according to an embodiment of the present invention, when a plurality of user terminals includes a desktop and a smart phone.

FIG. 6 shows a screen obtained by setting a service resolution for the desktop PC and the smart phone to 1600×1200 and 640×480, respectively, rendering a game scene, and transmitting the rendered result to the user terminal 130, in the case that the user terminal 130 includes the desktop PC and the smart phone.

While the invention has been shown and described with respect to the preferred embodiments, the present invention is not limited thereto. It will be understood by those skilled in the art that various changes and modifications may be made without departing from the scope of the invention as defined in the following claims.

What is claimed is:

1. A method for providing a multi-screen based multi-dimensional game service, the method comprising:
    determining a resolution of a game screen to be served based on user terminal information provided from a user terminal;
    storing a view for a user location on a multi-dimensional shared game space as a game session;
    generating an object for the view based on the determined resolution, and performing multi-view rendering using multi-dimensional scene data and game inputs of a user;
    capturing video and audio generated through the multi-view rendering; and encoding the captured video and audio, and transmitting the encoded video and audio to the user terminal.

2. The method of claim 1, wherein the view comprises a location of an observer, a focal point where the observer looks at, and a field of view.

3. The method of claim 1, wherein the encoding is performed using an MPEG-4 encoder or an H.264 encoder.

4. The method of claim 1, wherein the encoded video and audio are transmitted using a real-time protocol (RTP) or a real-time streaming protocol (RTSP).

5. An apparatus for providing a multi-screen based multi-dimensional game service, the apparatus comprising:
  a user terminal management block configured to determine a resolution of a game screen to be served based on user terminal information provided from a user terminal;
  a user game session management block configured to store a view for a user location on a multi-dimensional shared game space as a game session;
  a multi-view rendering execution block configured to generate an object for the view based on the determined resolution, and perform multi-view rendering using multi-dimensional scene data and game inputs of a user;
  an encoding block configured to encode video and audio generated through the multi-view rendering; and
  an encoding scene stream processing block configured to process the encoded video and audio to generate a game moving picture stream, and transmit the game moving picture stream to the user terminal.

6. The apparatus of claim 5, wherein the view comprises a location of an observer, a focal point where the observer looks at, and a field of view.

7. The apparatus of claim 5, wherein the encoding block comprises an MPEG-4 encoder or an H.264 encoder.

8. The apparatus of claim 5, wherein the encoding scene stream processing block is configured to transmit the game moving picture stream using a real-time protocol (RTP) or a real-time streaming protocol (RTSP).

9. A method for providing a multi-screen based multi-dimensional game service, the method comprising:
  determining a resolution of a game screen to be served based on user terminal information provided from a user terminal;
  checking whether or not a game session for the user terminal exists;
  if the game session exists, obtaining a view from the game session and adding the user view onto a multi-dimensional shared game space;
  if the game session does not exist, storing a view for an initial location of a user on the multi-dimensional shared gate space as the game session;
  generating an object for the view obtained from the game session or the view for the initial location based on the determined resolution, and performing multi-view rendering using multi-dimensional scene data and game inputs of the user;
  capturing video and audio generated through the multi-view rendering; and
  encoding the captured video and audio, and transmitting the encoded video and audio to the user terminal.

10. The method of claim 9, wherein a view comprises a location of an observer, a focal point where the observer looks at, and a field of view.

11. The method of claim 9, wherein the encoding is performed using an MPEG-4 encoder or an H.264 encoder.

12. The method of claim 9, wherein the encoded video and audio are transmitted using a real-time protocol (RTP) or a real-time streaming protocol (RTSP).

\* \* \* \* \*